United States Patent
Erickson et al.

(10) Patent No.: US 10,810,675 B2
(45) Date of Patent: Oct. 20, 2020

(54) PROVIDING TRANSIT ALTERNATIVES BASED ON MONITORED VEHICLE CHARACTERISTICS

(71) Applicant: Esurance Insurance Services, Inc., San Francisco, CA (US)

(72) Inventors: John Andrew Erickson, San Francisco, CA (US); Eric Anthony Madia, San Francisco, CA (US)

(73) Assignee: Esurance Insurance Services, Inc., San Francisco, CA (US)

(*) Notice: Subject to any disclaimer, the term of this patent is extended or adjusted under 35 U.S.C. 154(b) by 637 days.

(21) Appl. No.: 14/985,025

(22) Filed: Dec. 30, 2015

(65) Prior Publication Data

US 2016/0189311 A1   Jun. 30, 2016

Related U.S. Application Data (60) Provisional application No. 62/106,081, filed on Jan. 21, 2015, provisional application No. 62/098,556, filed on Dec. 31, 2014.

(51) Int. Cl.
| | |
|---|---|
| *G06Q 40/08* | (2012.01) |
| *G07C 5/00* | (2006.01) |
| *G07C 5/08* | (2006.01) |
| *B60K 35/00* | (2006.01) |
| *G01C 21/34* | (2006.01) |

(52) U.S. Cl.
CPC ............ *G06Q 40/08* (2013.01); *B60K 35/00* (2013.01); *G01C 21/3407* (2013.01); *G01C 21/3453* (2013.01); *G07C 5/008* (2013.01); *G07C 5/085* (2013.01); *B60K 2370/11* (2019.05); *B60K 2370/166* (2019.05); *B60K 2370/174* (2019.05); *Y02T 10/84* (2013.01)

(58) Field of Classification Search
CPC ........ G06Q 40/08; G06Q 50/30; G06Q 10/02; G06F 19/00
See application file for complete search history.

(56) References Cited

U.S. PATENT DOCUMENTS

| | | | | |
|---|---|---|---|---|
| 9,984,420 B1* | 5/2018 | Manzella | ............... | G06Q 40/08 |
| 2007/0083327 A1* | 4/2007 | Brice | ................... | G06Q 10/00 |
| | | | | 701/410 |
| 2007/0198276 A1* | 8/2007 | Hinrichs | ............... | G06Q 10/02 |
| | | | | 705/5 |

(Continued)

*Primary Examiner* — Hao Fu
(74) *Attorney, Agent, or Firm* — Banner & Witcoff, Ltd.

(57) ABSTRACT

Performance parameters of a vehicle can be measured by an on-board performance parameter measuring device. The performance parameters can be measured while the vehicle is being used. The measured performance parameters of the vehicle can be transmitted to a computing device. The computing device can be configured to generate a user cost that reflects a cost for insuring the vehicle based on the measured performance parameters of the vehicle. A graphical user interface can be generated by the computing device for presentation to a user via a display device, that graphical user interface can include the user cost. An alternative transportation route for the journey and an alternative transportation cost for the journey can be determined and presented to the user through the graphical user interface.

25 Claims, 6 Drawing Sheets

(56) References Cited

U.S. PATENT DOCUMENTS

| | | | |
|---|---|---|---|
| 2013/0046559 A1* | 2/2013 | Coleman | G06Q 10/10 705/4 |
| 2014/0046585 A1* | 2/2014 | Morris, IV | G01C 21/00 701/468 |
| 2014/0052479 A1* | 2/2014 | Kawamura | G06Q 40/08 705/4 |
| 2014/0257867 A1* | 9/2014 | Gay | G06Q 40/00 705/4 |
| 2014/0278616 A1* | 9/2014 | Stone | G06Q 10/025 705/6 |
| 2015/0193866 A1* | 7/2015 | Van Heerden | G06Q 40/02 705/35 |

* cited by examiner

PROVIDING TRANSIT ALTERNATIVES BASED ON MONITORED VEHICLE CHARACTERISTICS

CROSS-REFERENCE TO RELATED APPLICATIONS

This application claims priority to and the benefit of U.S. Provisional Patent Application No. 62/098,556, filed on Dec. 31, 2014, and titled "Charge-By-Mile with Transit Alternatives," and U.S. Provisional Patent Application No. 62/106,081, filed on Jan. 21, 2015, and titled "Methods and Systems to Provide Auto-Insurance In a Charge-By-Mile Chargeable Deposit With A Trip Estimator," which are incorporated herein by reference in their entities.

TECHNICAL FIELD

The subject matter described herein relates to providing transit alternatives based on monitored vehicle characteristics.

BACKGROUND

In the field of auto insurance, a fierce competition for market share has resulted in ever decreasing charge rates. This prompts a desire to find unique charging strategies that more accurately reflect service costs and revenue projections. Insurance cost is based on risk. Traditional insurance is priced based on parameters including the type of vehicle insured, the driving history of the policyholder and household members, socio-economic factors associated with the policyholder and household members, or the like.

While some customers may prefer the standard annual, or semi-annual charge for an insurance policy, other customers find this inappropriate. For example, customers who live in city centers may drive rarely.

SUMMARY

In one aspect, methods, systems, and computer program products, are provided that include operations for facilitating the determination of vehicle parameters which affect risk profiles of the vehicle. The operations can include measuring performance parameters of a vehicle while the vehicle is being used. A vehicle performance-measuring device can perform the measuring of the performance parameters of the vehicle. The measured performance parameters of the vehicle can be transmitted over a network to a computing device. The network can be the Internet, a cellular network, and/or other types of networks or links. The computing device receiving the transmitted measured performance parameters of the vehicle can be a server maintained by an organization that determines a risk profile of the vehicle and/or driver based on the performance parameters.

A user cost can be generated. The user cost can reflect a cost for insuring the vehicle based on the measured performance parameters of the vehicle. The user cost can reflect a cost of the fuel, cost of maintenance of the vehicle, cost of wear-and-tear of the vehicle, or the like, based on the measured performance parameters of the vehicle.

A graphical user interface can be generated for presentation to a user via a display device. The graphical user interface can include the user cost. The graphical user interface can be generated by a personal computing device of a user, a mobile computing device of a user, a server, or the like.

The graphical user interface can be presented to the user. The graphical user interface can be presented to the user through the display device.

In some variations, journey information can be received for the user. The journey information can be received through the graphical user interface. The journey information can be received through interactions, by the user, with the graphical user interface. The journey information can be entered, by the user, through the graphical user interface. In some variations, the graphical user interface can be presented on a touchscreen of a user device. The user can interact with the touchscreen of the user device to enter in journey information. Journey information can include, for example, an origin, a destination, a preferred time of arrival, a preferred time of departure, one or more route constraints, or the like.

A user cost can be generated for the journey based on the provided journey information. The user cost can be generated by one or more of the server, the personal computing device, the mobile computing device, or the like. The user cost can be based on historical performance parameters of the vehicle. The user cost can reflect the cost for insuring the vehicle during the journey. The user cost can reflect the fuel cost for the journey, wear-and-tear cost, maintenance cost, tolls, parking costs, or the like.

The user cost for the journey can be presented to the user via a display device. The user cost can be presented to the user in the graphical user interface, through the display device.

In some variations, an alternative transportation route for the journey can be determined. The alternative transportation route can be determined by a server, a personal computing device, a mobile computing device, or the like. An alternative transportation cost for the journey can be determined. The alternative transportation cost can be the cost for the user to take the determined alternative transport route. The alternative transport route can include a route taking public transport, human-powered transport, or the like.

The alternative transportation cost for the journey can be presented to the user. The alternative transportation cost can be presented to the user via the graphical user interface. A difference between the user cost and the alternative transportation cost for the journey can be determined and presented via the graphical user interface.

A selection of the alternative transportation route can be received from the user. The selection of the alternative transportation route can be received from the user through an interaction with the graphical user interface. In response to the selection of the alternative transportation route, one or more tickets for the user to take the alternative transportation route can be purchased. Execution of the purchase of the tickets can be performed by one or more of the server, personal computing device, mobile computing device, or the like.

The performance parameters can include a distance driven by the vehicle, one or more of an acceleration of the vehicle, a deceleration of the vehicle, and a g-force experienced by the vehicle, a speed of the vehicle, a location of the vehicle during usage of the vehicle, or the like. The performance parameters can include a time of day, day of the week, date information, or the like.

Road condition information can be received at the computing device. The road condition information can be associated with the usage of the vehicle. The user cost can be based on the road condition information. The road condition information can be obtained from one or more sensors associated with the vehicle. The road condition information can be obtained from one or more external resources, over a network.

In some variations, a balance of funds of the user can be presented to the user. The user cost can be deducted from the balance of funds in response to the user undertaking the journey. In some variations, an invoice can be generated for the user cost to send to the user. An invoice can be generated on a periodic basis.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Traditionally motor insurance is paid in advance for a predetermined period. For example, an insured may pay for a month, a six-month period, a year, or the like. The amount paid is typically based on one or more parameters associated with the insured vehicle and the policyholder. Such parameters can include a driving history of the policyholder, an age of the policyholder, a value of the vehicle, the type of vehicle, an expected usage of the vehicle by the policyholder, or the like. These parameters are then based on averages, through actuarial tables, to determine a premium for the policy. The traditional manner in which motor insurance is priced may be appropriate for an average driver. However, for outliers, there may be a more appropriate pricing model and opportunity for insurance providers to provide a more appropriate pricing model for insurance policies.

For example, the likelihood of a vehicle being involved in a collision when stationary is very much less than when being driven. Therefore, for a rarely-driven vehicle, the likelihood of the vehicle being in an accident requiring payments from an insurance company is relatively low compared to vehicles driven more frequently or for longer journeys. An insurance policy that allows a policyholder to pay for the miles travelled by the vehicle can be more desirable for such situations. With the present advances in technology, determination of driving habits of individual motorists is now possible. Consequently, a more bespoke pricing model can be developed for a motorist.

Factors such as the amount of miles driven by the insured vehicle, the manner in which the vehicle is driven, the route taken, the time of day used, the day of the week used, the date the vehicle is used, the weather when driven, the driving conditions when the vehicle is driven, or the like, can be monitored to determine a bespoke insurance premium for the policyholder. In some variations, a per-mile insurance premium can be determined. The insurance company can invoice the policyholder for the per-mile insurance premium based on the actual use of the vehicle.

Additional information can be obtained associated with the vehicle to determine a cost of a journey taken by the vehicle. For example, the cost of the fuel source for powering the vehicle, such as gasoline, electricity, or the like, can be obtained and used in conjunction with fuel consumption information to determine the cost of the fuel for powering the vehicle during the journey.

In some variations, a user can provide intended route information through a user computing device. The intended route information can include an origin, a destination, a time of day for travel, and the like. A cost for the journey, that includes fuel cost, insurance cost, toll costs, wear and tear costs, and the like, can be determined for using the vehicle. The journey cost for using the vehicle can be presented to the user through a user computing device. An alternative transport journey can be determined based on the route information provided by the user. The cost and duration for the alternative transport journey can be presented to the user. The user can then determine whether to use their vehicle or use alternative transport for the journey.

Figure 1:
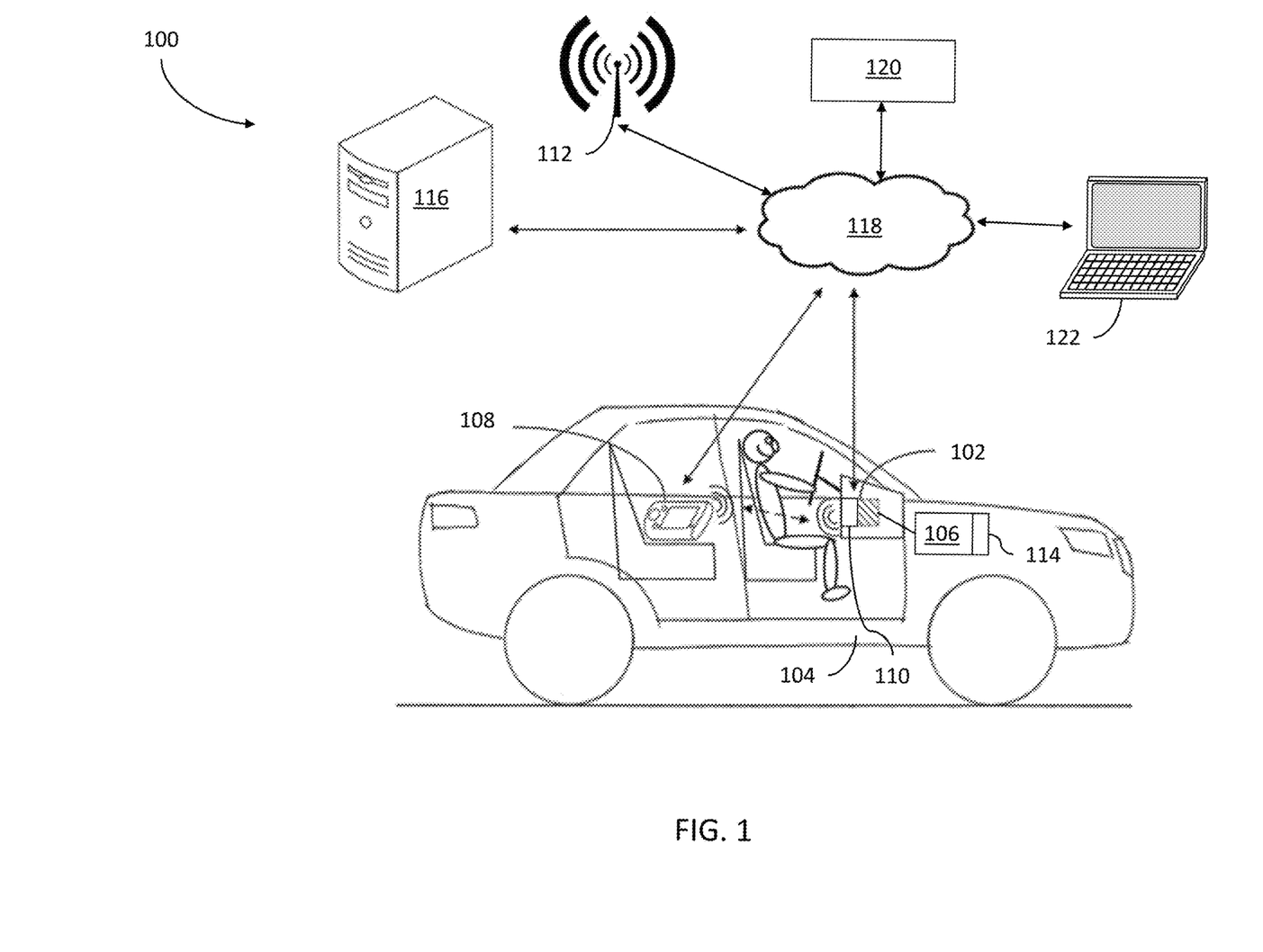
FIG. 1 is an illustration of a system having one or more features consistent with the current subject matter.

FIG. 1 is an illustration of a system 100 having one or more features consistent with the current subject matter. An auxiliary computing device 102 can be installed into a motor vehicle 104. The auxiliary computing device 102 can be installed in the motor vehicle 104 during the manufacturing process. For example, the computing device can be, or included in, the engine control unit 106 for the motor vehicle, in one or more additional computing devices in the motor vehicle, or the like. The auxiliary computing device 102 can be installed after manufacture of the vehicle 104. The auxiliary computing device 102 can be installed into one or more ports of the motor vehicle's own computing system, for example into the motor vehicle's on-board diagnostics (OBD) port. In some variations, a port, such as an OBD port, can be standardized, or semi-standardized, across the motor vehicle industry.

In some variations, the auxiliary computing device 102 can be a mobile computing device 108. Mobile computing device(s) 108 and the computing device 102 can act in concert, or independently, to monitor the driving parameters associated with the use of the vehicle 104.

The computing device 102 can include a communication device 110. The communication device 110 can be configured to communicate with one or more other additional computing devices, for example, mobile computing device 108, antenna 112, or the like. In some variations, the communication device 110 can be a wireless communication device. The wireless communication device can be configured to communicate over one or more wireless communication protocols, for example, WiFi, GSM, GPRS, NFC, Bluetooth, Sub-GHz Wireless Connectivity, or the like.

While the communication device 110 is illustrated in FIG. 1 as being included with the auxiliary computing device 102, the communication device 110 may be separate from the auxiliary computing device 102. The auxiliary computing device 102 can be in electronic communication with the communication device 110. For example, the auxiliary computing device 102 can be in electronic communication with a communication device 114 of the vehicle 104. The computing device 102 can be configured to communicate with one or more additional computing devices through the communication device 114 of the vehicle 104.

The auxiliary computing device 102 and/or the mobile computing device 108 can be configured to receive vehicle parameter information and/or measure vehicle parameters. Vehicle parameters can include a distance travelled by the vehicle, a speed of the vehicle, a g-force experienced by the vehicle, an acceleration or deceleration of the vehicle, the time the vehicle is in motion, the manner in which the vehicle is driven, an idle time of the vehicle, an engine speed of the vehicle, or the like.

In some variations, the auxiliary computing device 102 can be configured to obtain information associated with driving conditions during motion of the vehicle 104. For example, the auxiliary computing device 102 can be configured to obtain route information for the vehicle's journey. The route information can be obtained from GPS equipment of the vehicle 104. The auxiliary computing device 102 can wirelessly communicate with one or more mobile computing devices 108 carried by the driver, or in the driver's possession, that has GPS equipment. Route information can be used to determine whether the vehicle is driven along safer or more risky routes.

The auxiliary computing device 102 can be configured to transmit the vehicle parameter information to a server 116. The server 116 can be a server operated by an insurance company, for example, an insurance broker, an insurance underwriter, or the like. The auxiliary computing device 102 can be configured to transmit the vehicle parameter information to the server 116 over a network 118. The network 118 can be, for example, the Internet, GSM network, GPRS network, CDMA network, or the like.

The vehicle parameter information, including the information relating to the date and time of the use of the vehicle, can be correlated with information gathered from external sources 120. Information from external sources 120 can include weather information, road condition information, area risk profiles, accident information associated with roads, or sections of roads, travelled by the vehicle, or the like. The external sources 120 can provide information over the network 118. The external sources 120 can have dedicated communication links with server 116. Correlating time and date of vehicle usage with weather information can yield a determination of whether the vehicle was used during relatively risky, or relatively safe, weather conditions. Risk factors can be determined based on the vehicle parameter information to determine an insurance cost for the vehicle use. An insurance cost can be determined for a journey as a whole, on a per-mile basis, on a time basis, or the like.

In some implementations, the auxiliary computer device 102 is operated as an adapter that interfaces to an On-Board Diagnostics (OBD)-II port on a vehicle, although the auxiliary computer device 102 may be configured to operate with other standards and technologies as well to obtain the on-board data of the vehicle. When this is the case, the auxiliary computer device 102 may couple directly to the OBD-II, and include another wireless link to interface with other devices. For example, the auxiliary computer device 102 may include a short range link, such as WiFi, that couples to user equipment such as a mobile computing device 108 (for example, a smartphone, tablet, and/or the like). The mobile computing device 108 may include an application downloaded from a server or application store website that configures the mobile computing device 108 to relay information to servers such as server 116. For example, auxiliary computer device 102 may continuously monitor one or more aspects of the vehicle, provide that information via WiFi to device 108, which relays the information to server 116. Although the previous example describes the auxiliary computer device 102 has having a short range WiFi link, the auxiliary computer device 102 may have other types of interfaces and links including cellular as well. For example, the auxiliary computer device 102 may include a cellular transceiver to enable bypassing the mobile device 108 and accessing the server 116. The auxiliary computer device 102 may include other aspects including automatic collision detection (for example, accelerometer(s) to detect a collision), security (for example, encrypted links to the mobile device 108), navigation (access to, or built in, global positioning system or other navigation data), and/or the like.

Figure 2:
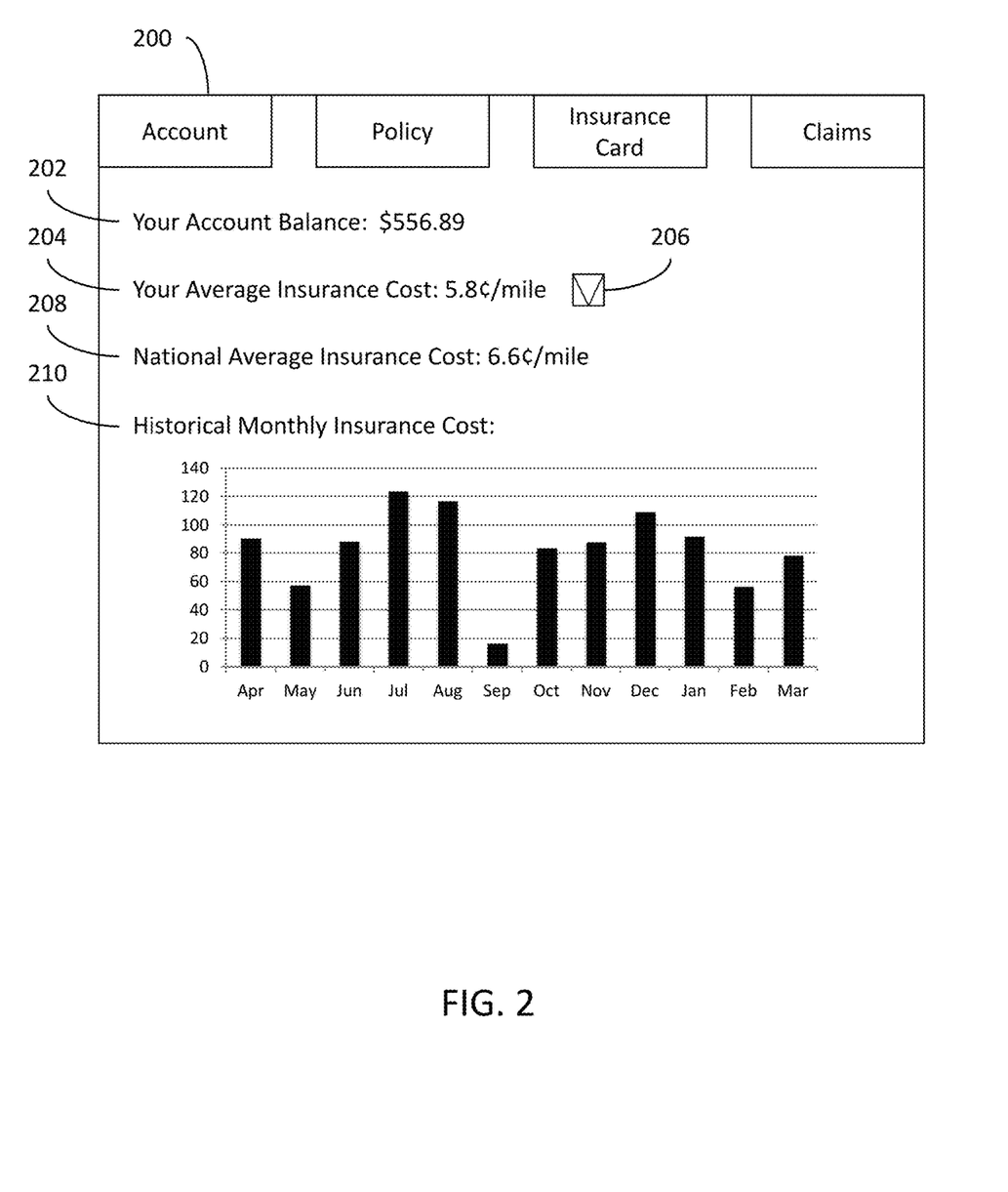
FIG. 2 is an illustration of a graphical user interface, having one or more features consistent with the present description.

FIG. 2 is an illustration of a graphical user interface 200, having one or more features consistent with the present description. Graphical user interface 200 can be presented to a user. The user can be an insurance policyholder. Graphical user interface 200 can be presented on a display device of a user computing device, such as user computing device 122 illustrated in FIG. 1. The graphical user interface 200 can be configured to present insurance information associated with the insurance policyholder. The graphical user interface 200 can be configured to present, to the user, an indication of one or more characteristics of their charge-by-distance insurance policy.

In some variations, the policyholder may load funds into an account associated with the insurance provider. The graphical user interface 200 can include an indication of an account balance 202. In some variations, the account balance can be applied to a determined insurance cost during use of the vehicle. In some variations, the account balance can be applied to a determined insurance cost on a periodic basis, for example, daily, weekly, monthly, or the like.

The graphical user interface 200 can include an indication of the average insurance cost 204 for the policyholder. The average insurance cost 204 can be provided on a per unit basis. The unit can be a distance travelled, a time unit, or the like. The average insurance cost 204 can be determined based on the average miles driven in a predefined period over a period of time, for example, the average miles driven per day over the course of a month. A radio button 206 can be provided in the graphical user interface 200. A user can interact with the radio button 206. The user can interact with the radio button 206 through clicking on the radio button with a peripheral input device of the user computing device 122. The peripheral input device can be one or more of a keyboard, mouse, touchpad, touch screen, or the like. In response to the user interaction with the radio button 206, the graphical user interface 200 can be configured to present, to the user, through the display device of the user computing device, detailed information associated with the computation of the average insurance cost 204. The detailed information associated with the computation of the average insurance cost 204 can include vehicle parameters indicating the manner in which the policyholder, or other driver, has driven the vehicle, routes taken, weather conditions, or the like. The detailed information can provide information as to how the vehicle parameters have affected the insurance cost for the policyholder.

The graphical user interface 200 can include an indication of the national average insurance cost for other policyholders 208. The national average insurance cost for other policyholders 208 can be based on the insurance cost for policy holders holding policies from the same insurance company, from all insurance companies, from a subset of insurance companies, or the like. The national average insurance cost for other policyholders 208 can be presented on the same per unit basis as the average insurance cost 204 for the policyholder.

The graphical user interface 200 can be configured to present a historical insurance cost 210. The historical insurance cost 210 can be presented as a table. The historical insurance cost 210 can be presented as a graph.

Figure 3:
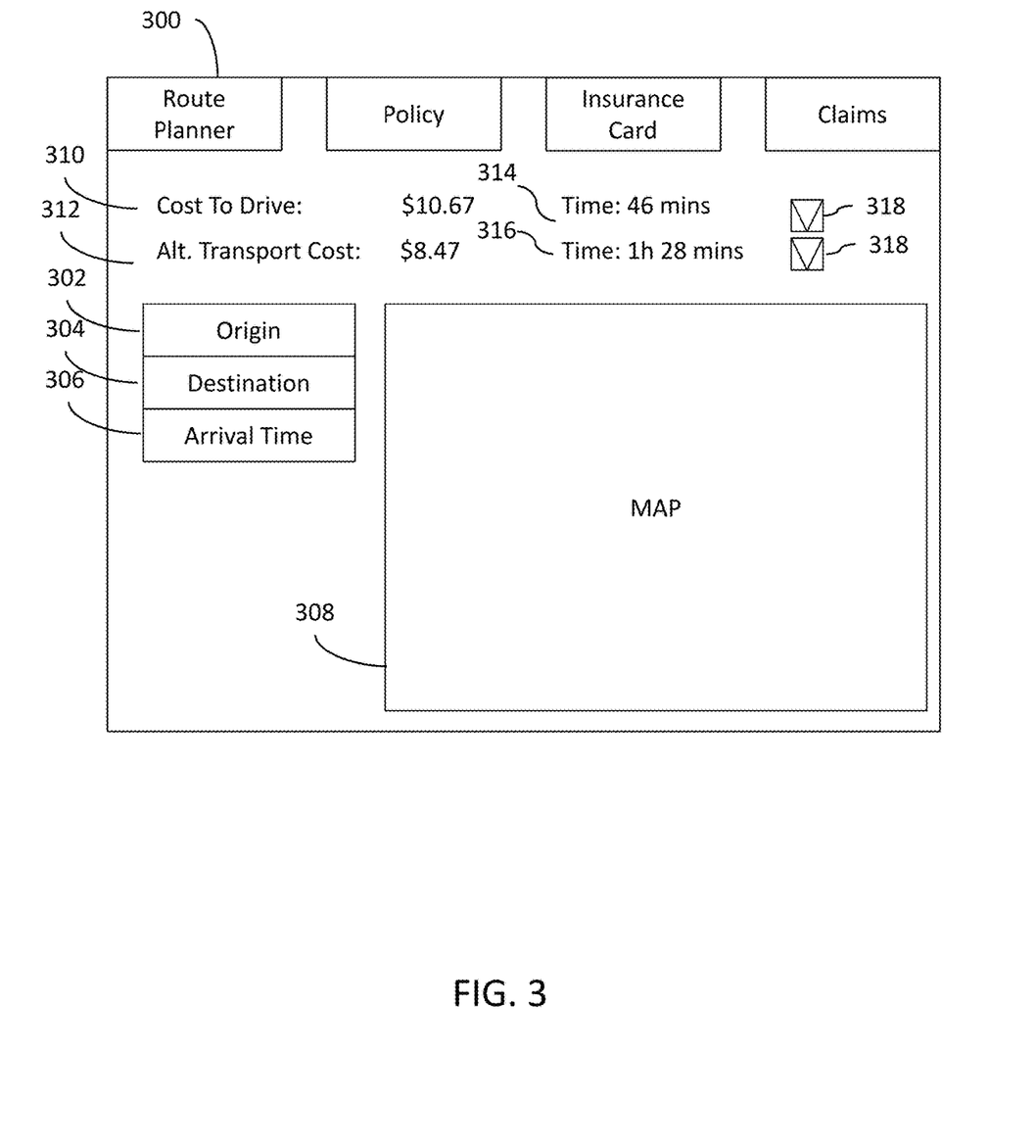
FIG. 3 is an illustration of a graphical user interface, having one or more features consistent with the current subject matter.

FIG. 3 is an illustration of a graphical user interface 300 having one or more features consistent with the current subject matter. The graphical user interface 300 can be configured to facilitate route planning for an intended journey by the policyholder or another driver covered by the insurance policy. The user, being the policyholder or another driver, can input route information into the graphical user interface 300. For example, the user can input an origin 302 for the route, a destination for the route 304, a desired arrival time 306, or the like.

In some variations, the user may enter the route information into a third-party route planning application. A third-party route planning application can include, for example, Google maps, Apple maps, Here, Waze, or the like. The insurance software application supporting the graphical user interface 300 can be configured to access the route planning information in the third-party route planning application. In some variations, the insurance software application can be configured to cause the personal computing device 122 to access the route planning information in a route planning application executed on the personal computing device 122. In some variations, the insurance software application can be configured to cause the personal computing device 122 to access the route planning information on one or more third-party servers maintained by the third-party route planning application providers. Such third-party server can be included as external resources 120 illustrated in FIG. 1.

The graphical user interface 300 can present a map 308 of the route to the user through a display device associated with the personal computing device 122. In some variations, multiple routes for the same journey can be displayed. Based on route parameters a determination of the estimated cost to drive 310 the route(s) can be determined. The estimated cost to drive 310 the route(s) can be presented to the user through the graphical user interface 300. The route parameters can include distance, time of day, historical congestion, historical driving characteristics of the driver along that route, the safety of the route, the weather conditions along the route, or the like. The route parameters can include historical fuel consumption along the route, or historical average fuel consumption of the vehicle when driven by the driver. The route parameters can include parking fees, toll fees, or other fees likely to be incurred by the driver along the route. In some variations, route parameter information can be obtained from the personal computing device 122 of the driver, a server 116 supporting the insurance software application, third party resources 120, or the like.

In some variations the route parameter information can be determined locally at the personal computing device 122 of the user. In other variations, the route parameter information can be determined at a server, such as server 116 supporting the insurance software application. In further variations, the route parameters can be determined by a combination of the personal computing device 122 and the server 116. In some variations, the route parameter information can be determined by a third-party resource, such as external resource 120. A request for route parameter information can be transmitted to the external resource 120, together with one or more data points, for determination of route parameter information.

The route parameters can affect the cost to drive the route 310. The cost to drive the route 310 may include non-constant variables, such as time-of-day information, weather information, congestion information, or the like. Non-constant variables can cause the cost to drive the route 310 to change. Constant variables may include distance, the car driven, toll costs, parking costs, or the like.

An alternative transport route can be determined in response to providing an origin 302, destination 304, and desired arrival time 306. The alternative transport route can include the use of one or more modes of alternative transport, including, public transport, e.g., taxi, bus, train, subway train, airplane, or the like, and human-powered modes of transport, e.g., walking, running, cycling, or the like. The insurance software application can be configured to facilitate selection by the user of one or more alternative transport parameters. For example, the insurance software application may facilitate limiting the modes of alternative transport, selection of an acceptable alternative transport route time, selection of a maximum alternative transport distances, or the like.

In some variations, the map 308 can be updated to show the alternative transport route. The alternative transport route can be presented in the map 308 alongside the car route.

An alternative transport cost 312 can be determined for the alternative transport route. The alternative transport cost 312 can be presented with the cost to drive 310 to illustrate a cost difference between the cost to drive 310 and the alternative transport cost 312. Factors influencing the cost to drive 310 and the alternative transport cost 312 can be generated on the graphical user interface. In some variations, a time to drive 314 can be determined and an alternative transport travel time 316 can be determined. The time to drive 314 and the alternative transport travel time 316 can be presented through the graphical user interface.

In some variations, one or more interactive radio buttons 318 can be generated on the graphical user interface 300 adjacent the cost to drive 310 and the alternative transport cost 112. Upon an interaction with the radio button(s) 318 information associated with the factors that influence the cost to drive 310 and the alternative transport cost 312 can be presented to the user through the graphical user interface 300. The graphical user interface 300 can be configured to present the cost of individual portions of the alternative transport cost 312 to the user.

In some variations, the insurance software application can be configured to purchase the alternative transport tickets for the public transport portion of the journey. The graphical user interface 300 can be configured to receive an interaction from the user with the graphical user interface 300. For example, the user, using a peripheral input device, can select various elements within the graphical user interface 300. A radio button can be generated on the graphical user interface 300, which when interacted with by the user can cause the insurance software application to initiate purchase of the alternative transport tickets. The insurance software application can be configured to cause the personal computing device 122 of the user to communicate with one or more alternative transport ticket servers. External server(s) 120 can be, in some variations, an alternative transport ticket server (s) Information requesting a purchase of the alternative transport tickets can be transmitted between the personal computing device 122 and the alternative transport servers. In some variations, the request to purchase the tickets may be transmitted through the server 116 maintained by the insurance provider.

In some variations, the cost of the alternative transport ticket(s) can be deducted from the account balance for the policyholder, held by the insurance company. In some variations, the user may be prompted to provide payment information to purchase the alternative transport ticket(s). In some variations, the user may have an account associated with the alternative transport provider(s). The application supporting the graphical user interface 300 can be configured to connect with the account associated with the alternative transport provider(s). The application executed on a user device 122 can be configured to cause the user device 122, server 116, or the like, to transmit a request to purchase alternative transport ticket(s) using the user's alternative transport account(s). The request can be received by one or more alternative transport ticket servers. External server(s) 120 can be, in some variations, alternative transport ticket server(s).

A determination of the estimated amount saved by travelling on alternative transport can be generated by the personal computing device 122 and/or the server 116, and presented to the user through the graphical user interface 300. A cumulative estimated amount saved can be determined and presented to the user through the graphical user interface 300.

Figure 4:
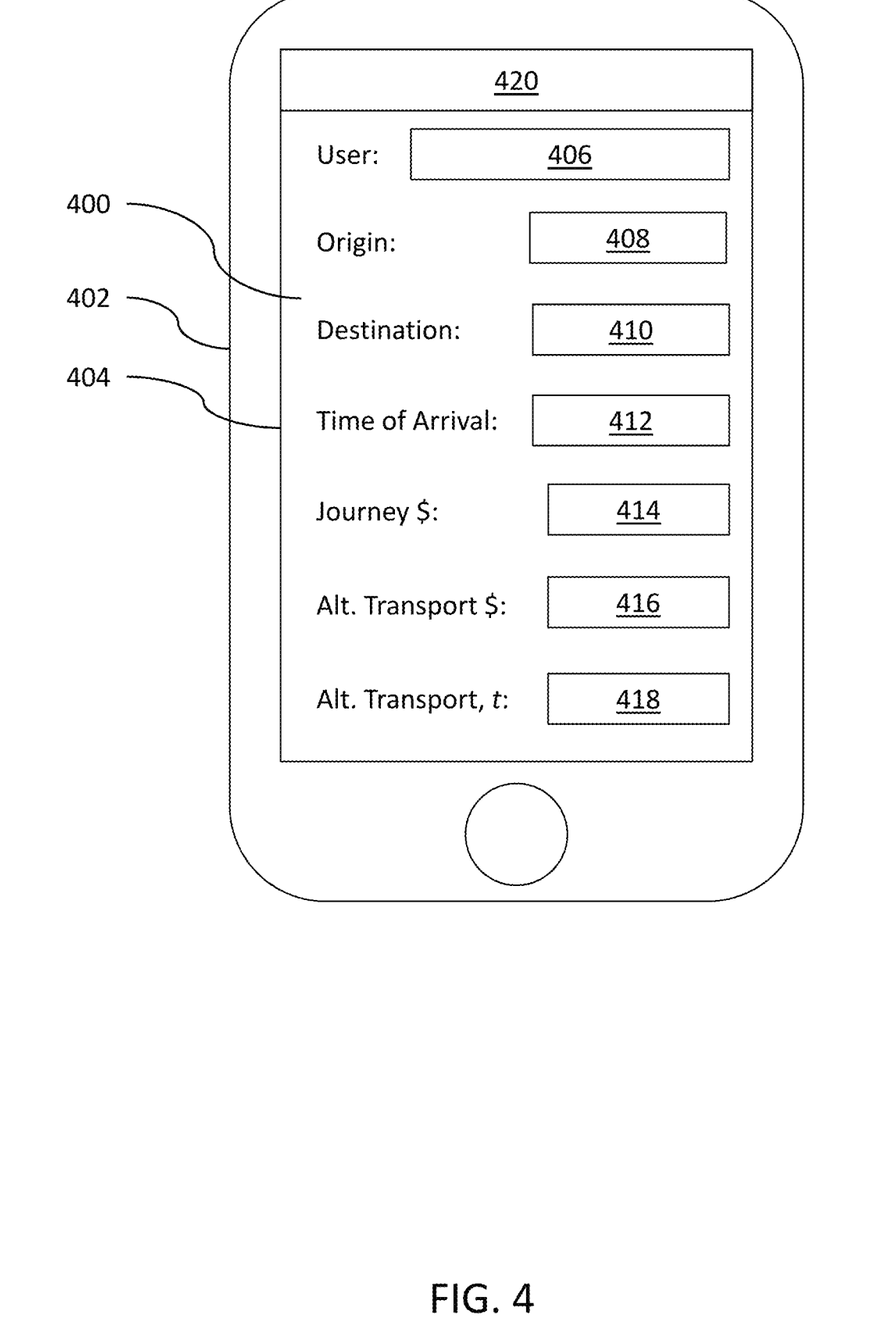
FIG. 4 is an illustration of a graphical user interface on a mobile computing device having features consistent with the present description.

FIG. 4 is an illustration of a graphical user interface 400 on a mobile computing device 402 having features consistent with the present description. The computing device 402 can be a computing device belonging or being used by the policyholder. The mobile computing device 402 can be configured to execute an insurance software application. The insurance software application can be configured to cause the mobile computing device 402 to present the graphical user interface 400 on a screen 404 of the mobile computing device 402.

In some variations, a user can cause the mobile computing device 402 to start an insurance application. The user can register with the policyholder's account information upon a request caused by the insurance application. The user need not be the policyholder. In some variations, the policyholder may add, on their insurance account, authorized drivers. Authorized drivers may be provided their own separate log-in credentials, and their own separate account. The authorized drivers' account may be associated with the policyholder's account. An indication of the user's identification 406 may be presented via the graphical user interface 400.

The mobile computing device 402 may be in communication with the personal computing device 122, as illustrated in FIG. 1, through network 118. The mobile computing device 402 may be in communication with one or more of the server 116, external resources 120, the auxiliary computing device 102, or the like.

In some variations, similar to the graphical user interface 300 of FIG. 3, a user may enter journey information. The user may enter an origin 408, destination 410, desired time of arrival 412, or the like. Based on the journey information, a determination can be made of the estimated cost 414 of the journey. The estimated cost 414 of the journey can be an estimated insurance cost for the journey. The estimated cost 414 of the journey can include an estimated insurance cost for the journey, an estimated fuel cost for the journey, toll costs, parking costs, wear-and-tear costs, or the like.

An alternative transport cost 416 can be determined for the journey and presented on the graphical user interface 400. The alternative transport cost 416 can be determined by the mobile computing device 402, the server 116 (as shown in FIG. 1), or the like. The alternative transport journey and the alternative transport cost 416 can be determined based on information obtained from one or more external resources 120. The alternative transport journey time 418 can be determined. The alternative transport journey time 418 can be presented through the graphical user interface.

The graphical user interface 400 may provide a graphical display to the client with diagrams, maps, and charts illustrating different routes that the client may use, including transit alternatives. For example, the client may be notified that a work commute on a certain Monday morning will cost $8 including the estimated cost of gas, time to complete, wear and tear of the vehicle, and insurance cost of the route, or the like. In some variations, the insurance can be charged on a charge-by-distance basis.

A notification 420 may be presented to the user through the graphical user interface 400. The notification 420 may be presented to the user in response to a trigger event. A trigger event may be a time of day, a time approaching the time of a scheduled meeting, or the like. A trigger event may be the mobile computing device 402 arriving at a location. The notification 420 may include a commute cost for the client by a transit alternative. A transit alternative can include public transport, for example, a bus, train, subway train, taxi, or the like. A transit alternative can include app-based transport services. A transit alternative can include human-powered transit alternatives, for example, walking, running, cycling, or the like. The client may select the notification 420. Selection of the notification 420 can result in the user being prompted to accept one of the transit alternatives for the journey.

The determination of the insurance cost may include the specific day, time of day, weather, traffic conditions, gas consumption, duration, or the like. Other factors that may be incorporated into the insurance cost may be likelihood of an accident on the selected route at the selected time, or the like. In some variations, the insurance provider may use its own database with aggregated, historical data covering a certain area to determine insurance premiums on a statistical basis. As an example, the insurance provider may determine that an intersection along the selected route has a high incidence of accidents within the selected time frame. The insurance provider may then increase the premium for the selected route at the selected time, on a charge-by-distance basis. In some embodiments, insurance cost on a charge-by-distance basis may be a monthly value based on a client usage statistics over a longer period of time (e.g., a month, six months, or the like). Alternative transit options can include train, trolleys, buses, ferry (boat) as well as other forms of transportation such as walking, riding a bicycle, or the like.

In some variations, the policyholder may be a professional driver. The policyholder, for example, may be a cab driver, town car driver, app-based driver, or the like. The mobile application can be configured to determine the insurance cost for particular routes to a customer's desired destination. If the customer desires to go a different route, the cost of the insurance may change. The cost of the journey for the customer may be updated based on the change in the cost of insurance. In some variations, the policyholder may be a rental car company, where the driver of the vehicle and the routes taken vary over time. The rental car company can offer customers short-term insurance policies from the insurance provider that also provides alternative route notifications to the car renters.

The server 116, illustrated in FIG. 1, can be configured to maintain insurance information associated with the policyholder. The cost of insurance provided to the policyholder can be continuously updated.

The server 116, personal computing device 122, auxiliary computing device 102, or the like, may comprise one or more processors. The processor(s) can be configured to provide information processing capabilities to the server 116, personal computing device 122, auxiliary computing device 102, or the like. The processor can include one or more of a digital processor, an analog processor, a digital circuit designed to process information, an analog circuit designed to process information, a state machine, and/or other mechanisms for electronically processing information. The processor may be a single entity, may include a plurality of processing units, or the like. The processing units may be physically located within the same device, or the processing units may represent processing functionality of a plurality of devices operating in coordination. The processor(s) can be configured to execute machine-readable instructions, which, when executed by the processor(s) can cause the processor(s) to perform one or more of the functions described in the present description. The functions described herein may be executed by software; hardware; firmware; some combination of software, hardware, and/or firmware; and/or other mechanisms for configuring processing capabilities on the processor(s).

Machine-readable instructions can be stored on electronic storage. Electronic storage may comprise electronic storage media that electronically stores information. The electronic storage media of may include one or both of system storage that is provided integrally (i.e., substantially non-removable) with a computing device and/or removable storage that is removably connectable to a server via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). Electronic storage may store software algorithms, information determined by the processor(s), information received from one or more computing devices, such as server 116, client computing devices 122, auxiliary computing device 102, information that enables the one or more computing device to function, or the like.

Figure 5:
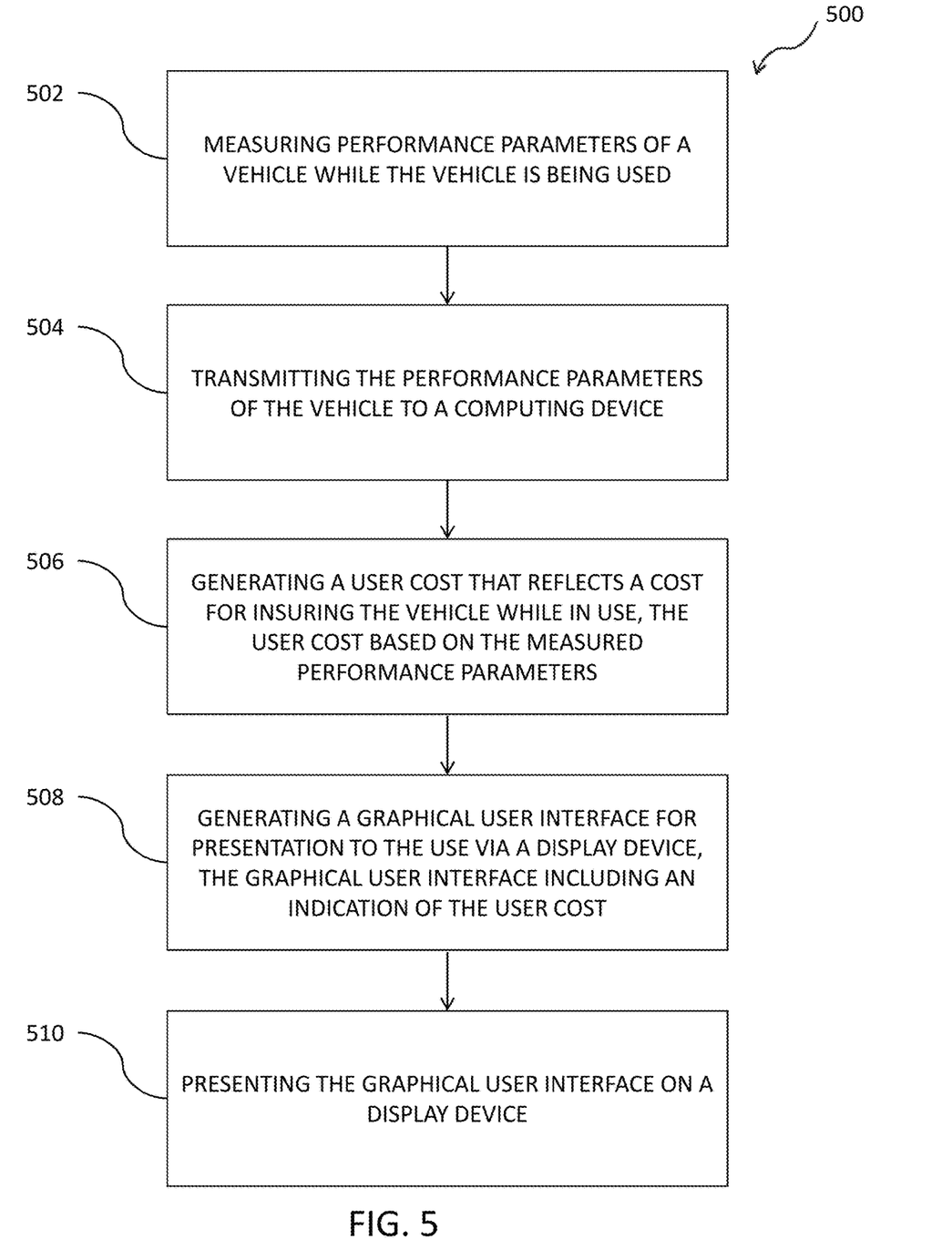
FIG. 5 illustrates a method having one or more features consistent with then current subject matter; and, FIG. 6 illustrates a method having one or more features consistent with then current subject matter.

FIG. 5 illustrates a method 500 having one or more features consistent with then current subject matter. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At 502, performance parameters of a vehicle while the vehicle is being used can be measured. The performance parameters of the vehicle can be measured using an auxiliary computing device installed in the vehicle. The auxiliary computing device can be a vehicle performance measuring device. The performance parameters of the vehicle can be measured by a mobile computing device. The mobile computing device can be, for example, a smartphone, tablet, or the like. The mobile computing device can include one or more sensors configured to obtain information about the motion of the mobile computing device. For example, a mobile computing device in a car may determine acceleration, deceleration, g-force, speed, direction, location, or the like of the mobile computing device. This information can then be extrapolated to the vehicle.

At 504, the measured performance parameters of the vehicle can be transmitted to a computing device. The transmission can occur over a network. The computing device can be a server operated by an insurance provider, such as server 116 illustrated in FIG. 1. The computing device can be a personal computing device, such as personal computing device 122 illustrated in FIG. 1.

At 506, a user cost can be generated. The user cost can reflect a cost for insuring the vehicle. The cost for insuring the vehicle can be based on the measured performance parameters of the vehicle. The user cost can include one or more other costs for operating the vehicle, for example, wear and tear costs, fuel costs, maintenance costs, or the like.

At 508, a graphical user interface can be generated. The graphical user interface can be generated using a computing device. The graphical user interface can be generated by the server 116, or the personal computing device 122, or a mobile computing device 108. The graphical user interface can be configured for presentation to a user via a display device. The graphical user interface can include the user cost.

At 510, the graphical user interface can be presented to the user. The graphical user interface can be presented on a display device associated with a computing device of the user.

Figure 6:
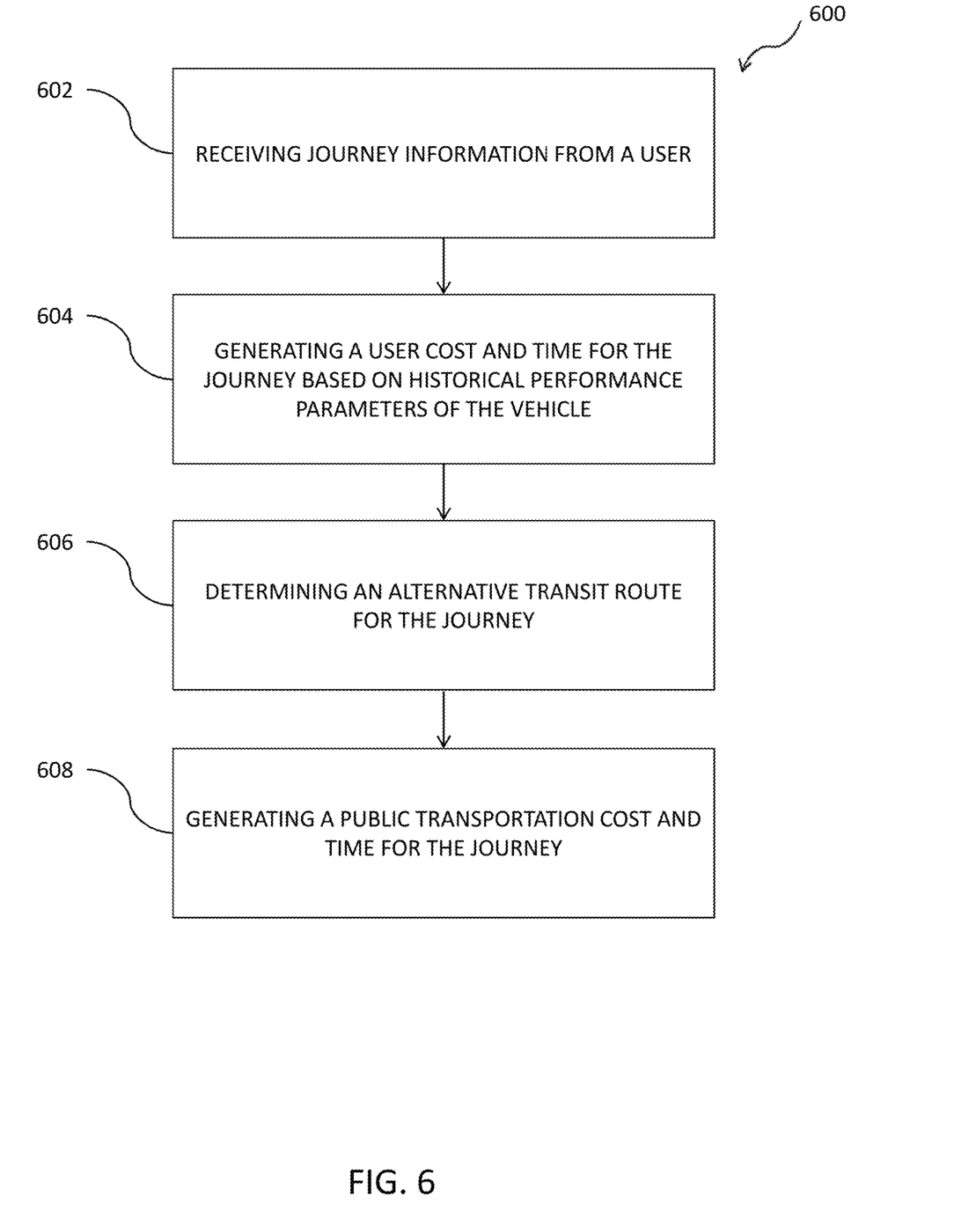

FIG. 6 illustrates a method 600 having one or more features consistent with then current subject matter. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At 602, journey information for the user can be received through the graphical user interface.

At 604, a user cost for the journey can be generated. The user cost can be generated using the computing device. For example, the user cost can be generated by a server, a personal computing device, a mobile computing device, or the like. The user cost can be based on historical performance parameters of the vehicle. The user cost can reflect the cost for insuring the vehicle during the journey. An expected journey time can be determined for the journey.

At 606, an alternative transit route can be determined for the journey.

At 608, an alternative transportation cost for the journey can be generated. An alternative transportation journey time can be determined for the journey.

The alternative transit route and cost can be presented to the user through the graphical user interface. A difference between the user cost and the alternative transportation cost for the journey can be determined by one or more of the computing devices. An indication of the difference between the user cost and the alternative transportation cost for the journey can be presented to the user via the graphical user interface.

In some variations, a selection of the alternative transportation route can be received. The selection can be received through an interaction by the user with the graphical user interface. One or more tickets for the user to take the alternative transportation route can be purchased using one or more of the computing devices.

Without in any way limiting the scope, interpretation, or application of the claims appearing herein, a technical effect of one or more of the example embodiments disclosed herein may include monitoring using vehicle-installed computing devices, personal computing device, mobile computing device, or the like, vehicle usage parameters to determine appropriate costs associated with a specific vehicles specific use by a specific driver.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method, comprising:
   measuring, by a vehicle performance measuring device, performance parameters of a vehicle while the vehicle is being used by a user, the vehicle performance measuring device being coupled, via a first wireless link, to a mobile computing device of the user;
   receiving, at a server, the measured performance parameters of the vehicle, the measured performance parameters being transmitted by the mobile computing device to the server over a second wireless link;
   updating, based on the measured performance parameters, a route parameter of a first route, the route parameter comprising a historical driving characteristic of the user along the first route;
   receiving, from the mobile computing device, an indication of a trigger event including the mobile computing device having arrived at a location;
   in response to the trigger event,
      determining, based at least on the route parameter, a first transport cost for completing a journey from the location using the vehicle and a second transport cost for completing the journey from the location without the vehicle, the first transport cost including a first cost for insuring the vehicle if the first route is used for completing the journey, and
      generating, by the server, a graphical user interface for display at the mobile computing device, the graphical user interface including a notification of the first transport cost and the second transport cost;
   deducting, from a balance of funds of the user, the first cost of insuring the vehicle in response to the user selecting to use the vehicle to complete the journey via the first route; and
   updating the graphical user interface to at least display, at the mobile computing device, the balance of funds of the user.

2. The method of claim 1, further comprising:
   determining, by the server, a difference between the first transport cost and the second transport cost; and,
   updating the graphical user interface to at least display, at the mobile computing device, an indication of the difference between the first transport cost and the second transport cost.

3. The method of claim 1, further comprising:
   determining, based at least on the route parameter and information for the journey, a third transport cost for using the vehicle to complete the journey from the location via a second route, the third transport cost including a second cost for insuring the vehicle if the second route is used for completing the journey;
   generating, by the server, the graphical user interface to further display, at the mobile computing device, the third transport cost; and
   deducting, from the balance of funds of the user, the second cost of insuring the vehicle in response to the user selecting to use the vehicle to complete the journey via the second route.

4. The method of claim 1, wherein the first transport cost and/or the second transport cost further reflect a cost of a fuel consumed by the vehicle.

5. The method of claim 1, wherein the first transport cost and/or the second transport cost further reflect a cost of wear and tear of the vehicle.

6. The method of claim 1, wherein the performance parameters of the vehicle include a distance driven by the vehicle.

7. The method of claim 1, wherein the performance parameters of the vehicle include one or more of an acceleration of the vehicle, a deceleration of the vehicle, and a g-force experienced by the vehicle.

8. The method of claim 1, wherein the performance parameters of the vehicle include a speed of the vehicle.

9. The method of claim 1, wherein the performance parameters of the vehicle include a location of the vehicle during usage of the vehicle.

10. The method of claim 1, wherein the performance parameters of the vehicle include one or more of a time of day, a day of the week, or a date, of usage of the vehicle.

11. The method of claim 1, wherein the server further updates the route parameter of the first route based on a road condition information associated with the first route.

12. The method of claim 1, further comprising:
    sending, to the user, an invoice generated based at least on the user selecting to use the vehicle to complete the journey via the first route.

13. The method of claim 1, wherein the trigger event further includes a time of day and/or a current time approaching a scheduled time of a meeting.

14. A system, comprising:
    at least one data processor; and
    at least one memory instructions, which when executed by the at least one data processor, result in operations comprising:
       measuring, by a vehicle performance measuring device, performance parameters of a vehicle while the vehicle is being used by a user, the vehicle performance measuring device being coupled, via a first wireless link, to a mobile computing device of the user;

receiving, at a server, the measured performance parameters of the vehicle, the measured performance parameters being transmitted by the mobile computing device to the server over a second wireless link;

updating, based on the measured performance parameters, a route parameter of a first route, the route parameter comprising a historical driving characteristic of the user along the first route;

receiving, from the mobile computing device, an indication of a trigger event including the mobile computing device having arrived at a location, in response to the trigger event, determining, based at least on the route parameter, a first transport cost for completing a journey from the location using the vehicle and a second transport cost for completing the journey from the location without the vehicle, the first transport cost including a first cost for insuring the vehicle if the first route is used for completing the journey, and generating, by the server, a graphical user interface for display at the mobile computing device, the graphical user interface including a notification of the first transport cost and the second transport cost;

deducting, from a balance of funds of the user, the first cost of insuring the vehicle in response to the user selecting to use the vehicle to complete the journey via the first route; and updating the graphical user interface to at least display, at the mobile computing device, the balance of funds of the user.

15. The system of claim 14, wherein the operations further comprise:

determining a difference between the first transport cost and the second transport cost; and, updating the graphical user interface to at least display, at the mobile computing device, an indication of the difference between the first transport cost and the second transport cost.

16. The system of claim 14, wherein the operations further comprise:

determining, based at least on the route parameter and information for the journey, a third transport cost for using the vehicle to complete the journey from the location via a second route, the third transport cost including a second cost for insuring the vehicle if the second route is used for completing the journey;

generating, by the server, the graphical user interface to further display, at the mobile computing device, the third transport cost; and deducting, from the balance of funds of the user, the second cost of insuring the vehicle in response to the user selecting to use the vehicle to complete the journey via the second route.

17. The system of claim 14, wherein the first transport cost and/or the second transport cost further reflect a cost of power usage of the vehicle.

18. The system of claim 14, wherein the first transport cost and/or the second transport cost further reflect a cost of wear and tear of the vehicle.

19. The system of claim 14, wherein the performance parameters of the vehicle include a distance driven by the vehicle.

20. The system of claim 14, wherein the performance parameters of the vehicle include one or more of an acceleration of the vehicle, a deceleration of the vehicle, and a g-force experienced by the vehicle.

21. The system of claim 14, wherein the performance parameters of the vehicle include a speed of the vehicle.

22. The system of claim 14, wherein the performance parameters of the vehicle include a location of the vehicle during usage of the vehicle.

23. The system of claim 14, wherein the route parameter is further updated based on a road condition information associated with the first route.

24. The system of claim 14, wherein the operations further comprise:

sending, to the user, an invoice generated based at least on the user selecting to use the vehicle to complete the journey via the first route.

25. A non-transitory computer program product storing instructions that, when executed by at least one programmable processor forming part of at least one computing system, cause the at least one programmable processor to perform operations comprising:

measuring, by a vehicle performance measuring device, performance parameters of a vehicle while the vehicle is being used by a user, the vehicle performance measuring device being coupled, via a first wireless link, to a mobile computing device of the user;

receiving, at a server, the measured performance parameters of the vehicle, the measured performance parameters being transmitted by the mobile computing device to the server over a second wireless link;

updating, based on the measured performance parameters, a route parameter of a first route, the route parameter comprising a historical driving characteristic of the user along the first route;

receiving, from the mobile computing device, an indication of a trigger event including the mobile computing device having arrived at a location;

in response to the trigger event, determining, based at least on the route parameter, a first transport cost for completing a journey from the location using the vehicle and a second transport cost for completing the journey from the location without the vehicle, the first transport cost including a first cost for insuring the vehicle if the first route is used for completing the journey, and generating, by the server, a graphical user interface for display at the mobile computing device, the graphical user interface including a notification of the first transport cost and the second transport cost;

deducting, from a balance of funds of the user, the first cost of insuring the vehicle in response to the user selecting to use the vehicle to complete the journey via the first route; and updating the graphical user interface to at least display, at the mobile computing device, the balance of funds of the user.

* * * * *